US010361493B2

(12) United States Patent
De France et al.

(10) Patent No.: US 10,361,493 B2
(45) Date of Patent: Jul. 23, 2019

(54) SPRING LOADED PARALLEL PAD CLAMP CONNECTORS CONNECTABLE USING LINEMAN HOT STICKS

(71) Applicant: HUBBELL INCORPORATED, Shelton, CT (US)

(72) Inventors: Robert Victor De France, Poughkeepsie, NY (US); Daniel David Dobrinski, Hillsboro, NH (US); Jefferson Robert Hall, Concord, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 550 days.

(21) Appl. No.: 15/085,981

(22) Filed: Mar. 30, 2016

(65) Prior Publication Data

US 2016/0294074 A1    Oct. 6, 2016

Related U.S. Application Data

(60) Provisional application No. 62/140,437, filed on Mar. 30, 2015.

(51) Int. Cl.
  *H01R 11/15*    (2006.01)
  *H01R 4/42*     (2006.01)
(52) U.S. Cl.
  CPC .............. *H01R 4/42* (2013.01); *H01R 11/15* (2013.01)
(58) Field of Classification Search
  CPC .................................................. H01R 11/15
  See application file for complete search history.

(56) References Cited

U.S. PATENT DOCUMENTS

| 1,920,168 | A |   | 12/1930 | Bodendieck |           |
|-----------|---|---|---------|------------|-----------|
| 1,853,598 | A |   | 4/1932  | Birkenmaier |          |
| 2,095,137 | A |   | 10/1937 | Johnson    |           |
| 2,530,299 | A |   | 11/1950 | Hendley    |           |
| 2,868,051 | A |   | 1/1959  | Dupre      |           |
| 3,142,525 | A | * | 7/1964  | Roosman    | H01R 11/15 |
|           |   |   |         |            | 403/188   |
| 3,177,459 | A |   | 4/1965  | Toedtman   |           |
| 3,568,269 | A |   | 3/1971  | Moretti    |           |
| 3,600,784 | A |   | 8/1971  | Propst     |           |
| 3,788,691 | A |   | 1/1974  | McMullin   |           |
| 3,868,164 | A |   | 2/1975  | Lisk       |           |
| 4,400,048 | A |   | 8/1983  | Sacks      |           |
| 4,707,051 | A |   | 11/1987 | Hall       |           |

(Continued)

OTHER PUBLICATIONS

International Preliminary Report on Patentability for the corresponding international application No. PCT/US2016/025086, 7 pages, dated Oct. 12, 2017.

(Continued)

*Primary Examiner* — Tho D Ta
(74) *Attorney, Agent, or Firm* — Ohlandt, Greeley, Ruggiero & Perle, L.L.P.

(57) ABSTRACT

A spring loaded parallel pad clamp connector is provided. The clamp includes a top jaw; a bottom jaw having an eye depending therefrom; one or more springs biasing the top and bottom jaws to a closed position; and a surface positioned a predetermined distance from the eye so that the surface acts as a fulcrum and force translation surface for a lineman hot stick.

17 Claims, 17 Drawing Sheets

(56) References Cited

U.S. PATENT DOCUMENTS

| | | | | |
|---|---|---|---|---|
| 5,556,299 | A | * | 9/1996 | Finke .................... H01R 11/15 439/479 |
| 5,933,924 | A | | 8/1999 | Nowlen |
| 7,111,526 | B1 | * | 9/2006 | Flojo ........................ B25B 5/06 294/118 |
| 7,666,024 | B2 | * | 2/2010 | De France ............ H01R 11/15 439/479 |
| 7,775,570 | B2 | | 8/2010 | Taylor |
| 8,512,070 | B2 | | 8/2013 | DeFrance |
| 8,651,891 | B2 | * | 2/2014 | Balfour ................ H01R 11/14 439/479 |
| 8,672,716 | B2 | | 3/2014 | DeFrance |

OTHER PUBLICATIONS

International Search Report dated Jul. 5, 2016 from corresponding International Application No. PCT/US16/25086; 4 pages.
Written Opinion dated dated Jul. 5, 2016 from corresponding International Application No. PCT/US16/25086; 12 pages.

* cited by examiner

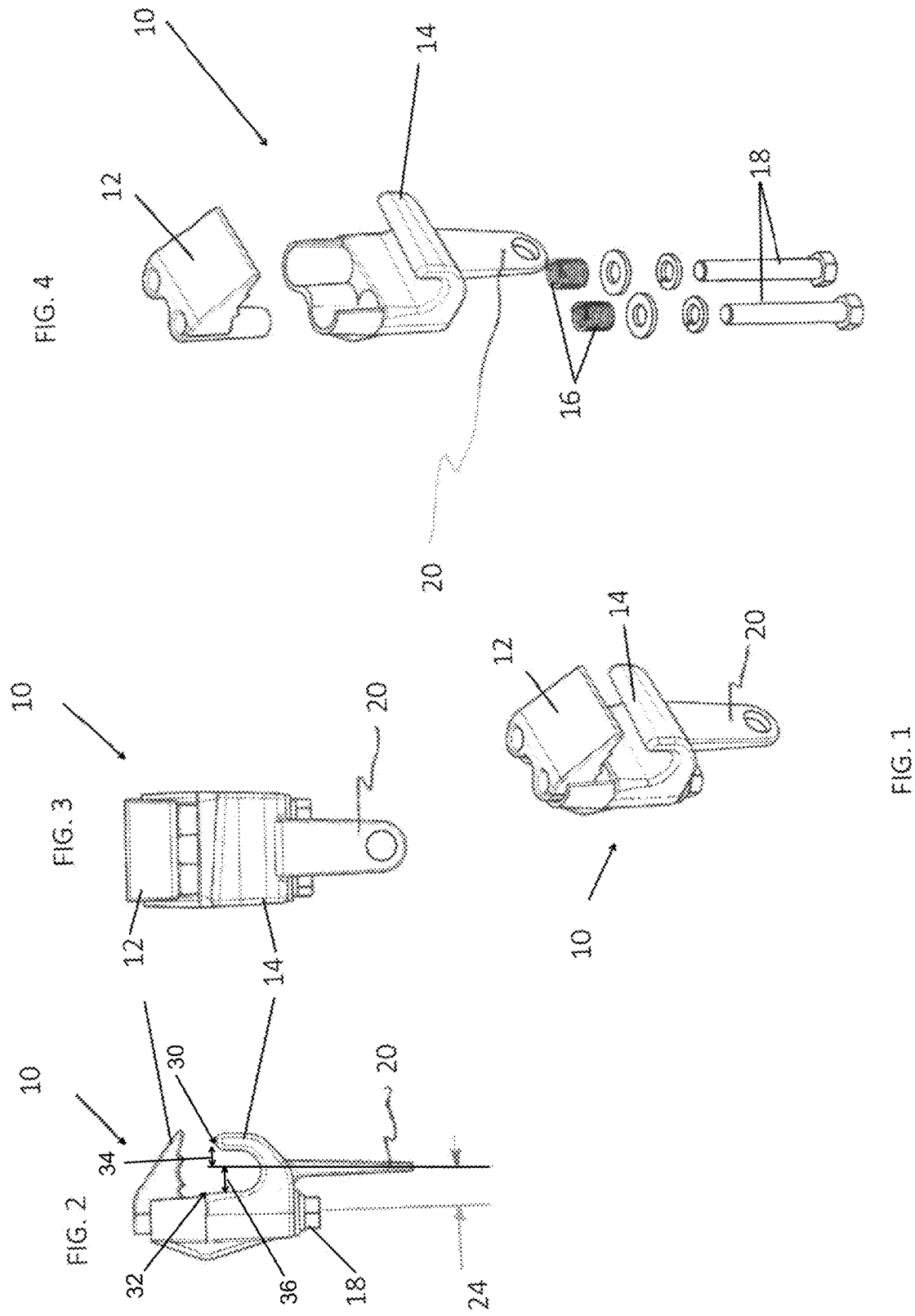

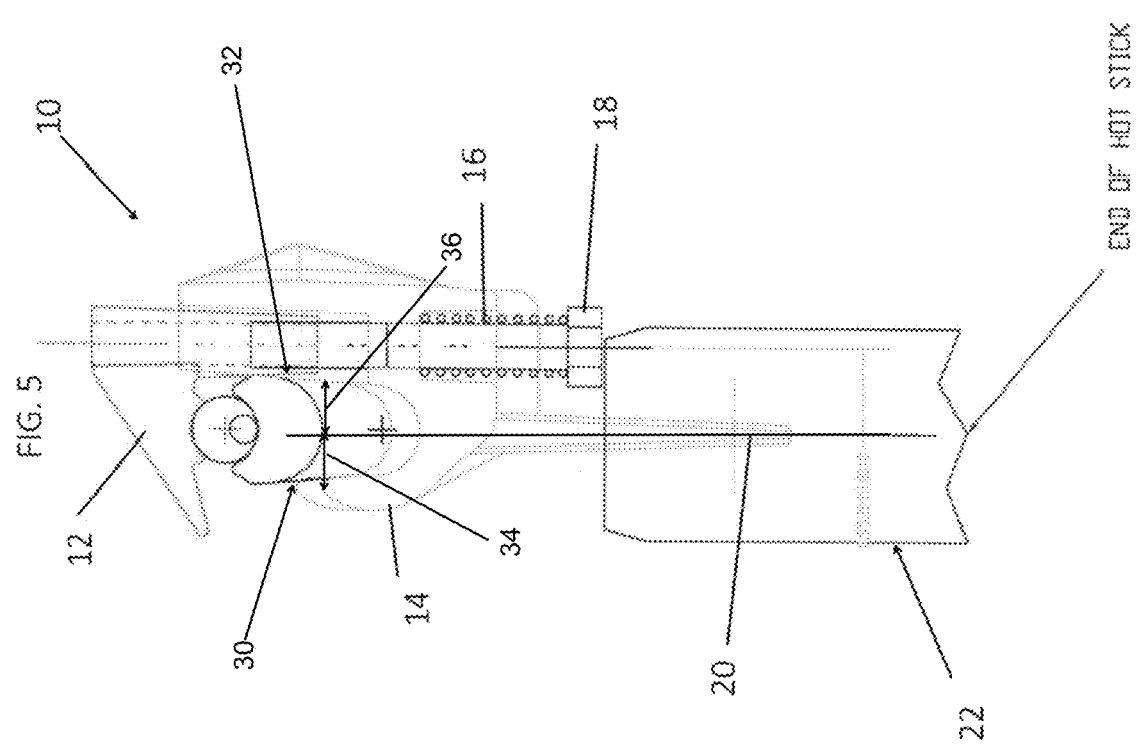

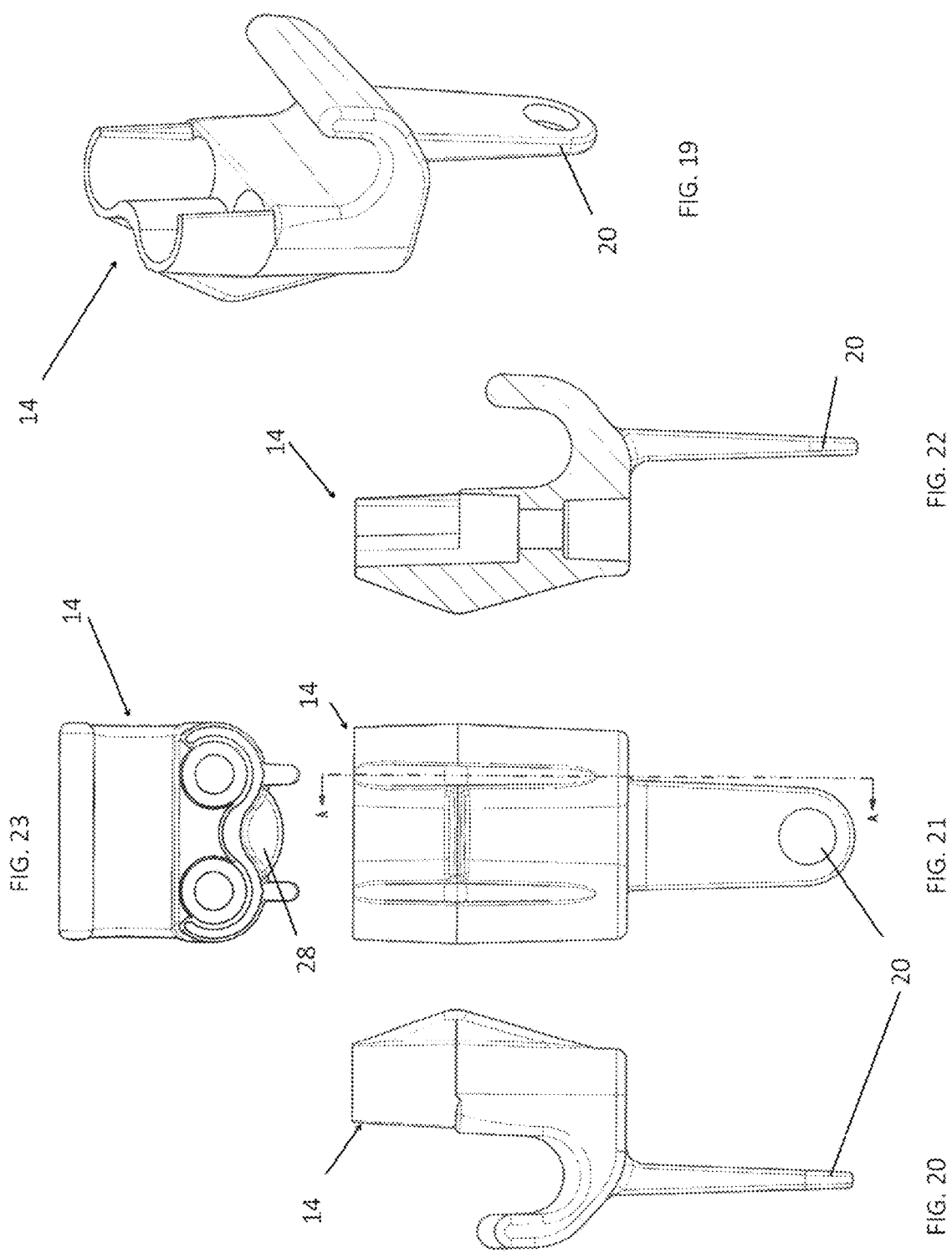

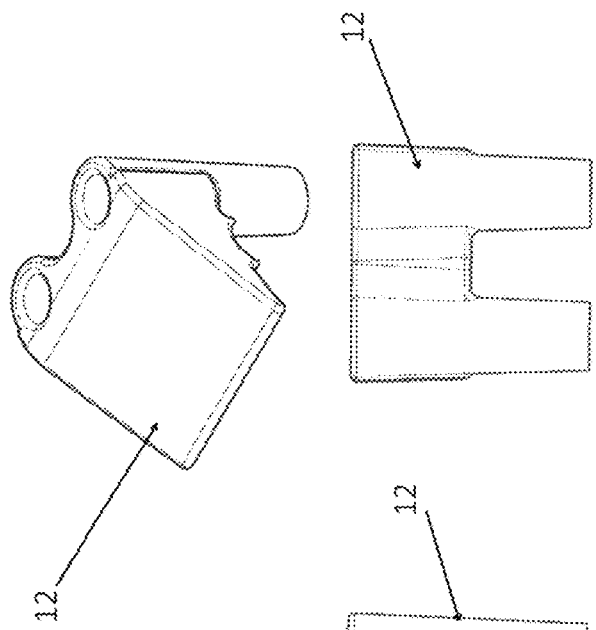
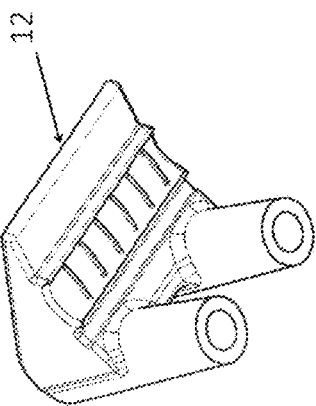
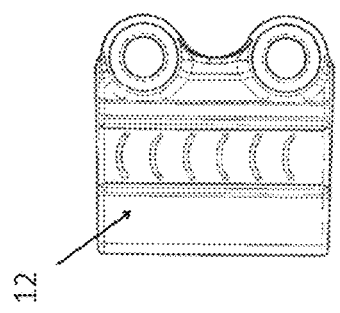
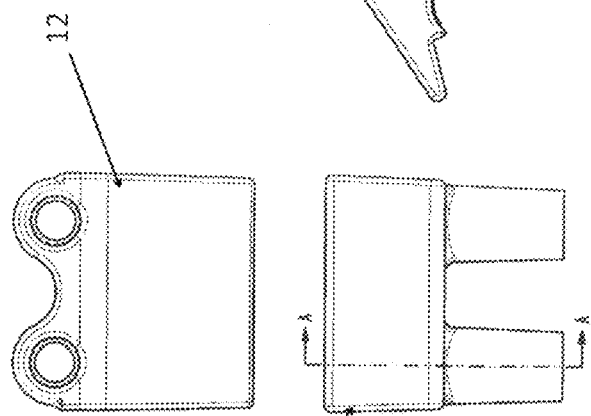
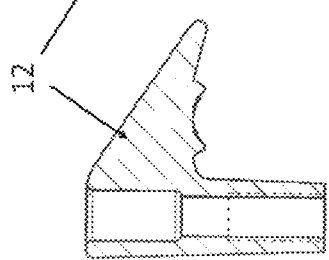

US 10,361,493 B2

SPRING LOADED PARALLEL PAD CLAMP CONNECTORS CONNECTABLE USING LINEMAN HOT STICKS

CROSS REFERENCE TO RELATED APPLICATIONS

This application claims the benefit of U.S. Provisional Application Ser. No. 62/140,437 filed Mar. 30, 2015, the contents of which are incorporated herein by reference.

BACKGROUND

1. Field of the Disclosure

The present disclosure is related to spring loaded parallel pad clamp connectors for electrical conductors. More particularly, the present disclosure is related spring loaded parallel pad clamp connectors that are configured for connection to electrical conductors using lineman hot sticks.

2. Description of Related Art

Spring-loaded hot sticks for manipulating various electrical components are known and are described in the prior art such as, but not limited to, U.S. Pat. Nos. 1,920,168 and 3,600,784, which are incorporated by reference herein. Hot sticks allow linemen to engage overhead power distribution lines, which can increase the safety of the linemen.

One electrical component that linemen often connect to overhead power distribution lines are known as spring loaded parallel pad clamp connectors. These clamp connectors are described in the prior art such as, but not limited to, Applicant's own U.S. Pat. No. 7,666,024, which is also incorporated by reference herein.

It has been determined by the present application that there is a need for spring loaded parallel pad clamp connectors that are connectable to the overhead power distribution lines using lineman hot sticks.

SUMMARY

Spring loaded parallel pad clamp connectors are provided that are connectable to overhead power distribution lines or other electrical conductors using lineman hot sticks. As used herein the term "connectable" shall mean the connection to and/or the removal from the overhead power distribution lines.

A spring loaded parallel pad clamp connector is provided. The clamp includes a top jaw; a bottom jaw having an eye depending therefrom; one or more springs biasing the top and bottom jaws to a closed position; and a surface positioned a predetermined distance from the eye so that the surface acts as a fulcrum and force translation surface for a lineman hot stick.

A method of connecting a spring loaded parallel pad clamp connector to a conductor is provided. The method includes moving a hot stick to an open position; placing an eye of the clamp onto a hook of the hot stick while the hot stick is in the open position; moving the hot stick to a closed position such that the hook withdraws the eye into the hot stick and the clamp abuts the hot stick so that the hook moves the clamp to an open position; moving the clamp, while in the open position, onto the conductor using the hot stick; and returning the hot stick to the open position to allow withdrawal of the hook from the eye.

The above-described and other features and advantages of the present disclosure will be appreciated and understood by those skilled in the art from the following detailed description, drawings, and appended claims.

BRIEF DESCRIPTION OF THE DRAWINGS

FIG. 1 is a top perspective view of an exemplary embodiment of a spring loaded parallel pad clamp connector according to the present disclosure—shown in a closed position;

FIG. 2 is a side view of the connector of FIG. 1;

FIG. 3 is a front view of the connector of FIG. 1;

FIG. 4 is a partially exploded view of the connector of FIG. 1;

FIG. 5 is a partial sectional depiction of the connector of FIG. 1 in use with a lineman hot stick, where the hot stick is shown in a closed position;

FIG. 19 is a front perspective view of a bottom jaw of the clamp of FIG. 1;

FIG. 20 is a side view of the bottom jaw of FIG. 19;

FIG. 21 is a front view of the bottom jaw of FIG. 19;

FIG. 22 is a sectional view of the bottom jaw of FIG. 19, taken along line A-A of FIG. 21;

FIG. 23 is a top view of the bottom jaw of FIG. 19;

FIG. 24 is a top perspective view of a top jaw of the clamp of FIG. 1;

FIG. 25 is a bottom perspective view of the top jaw of FIG. 24;

FIG. 26 is a top view of the top jaw of FIG. 24;

FIG. 27 is a bottom view of the top jaw of FIG. 24;

FIG. 28 is a side view of the top jaw of FIG. 24;

FIG. 29 is a rear view of the top jaw of FIG. 24;

FIG. 30 is a front view of the top jaw of FIG. 24; and

FIG. 31 is a sectional view of the top jaw of FIG. 24, taken along line A-A of FIG. 30.

DETAILED DESCRIPTION

Figure 6:
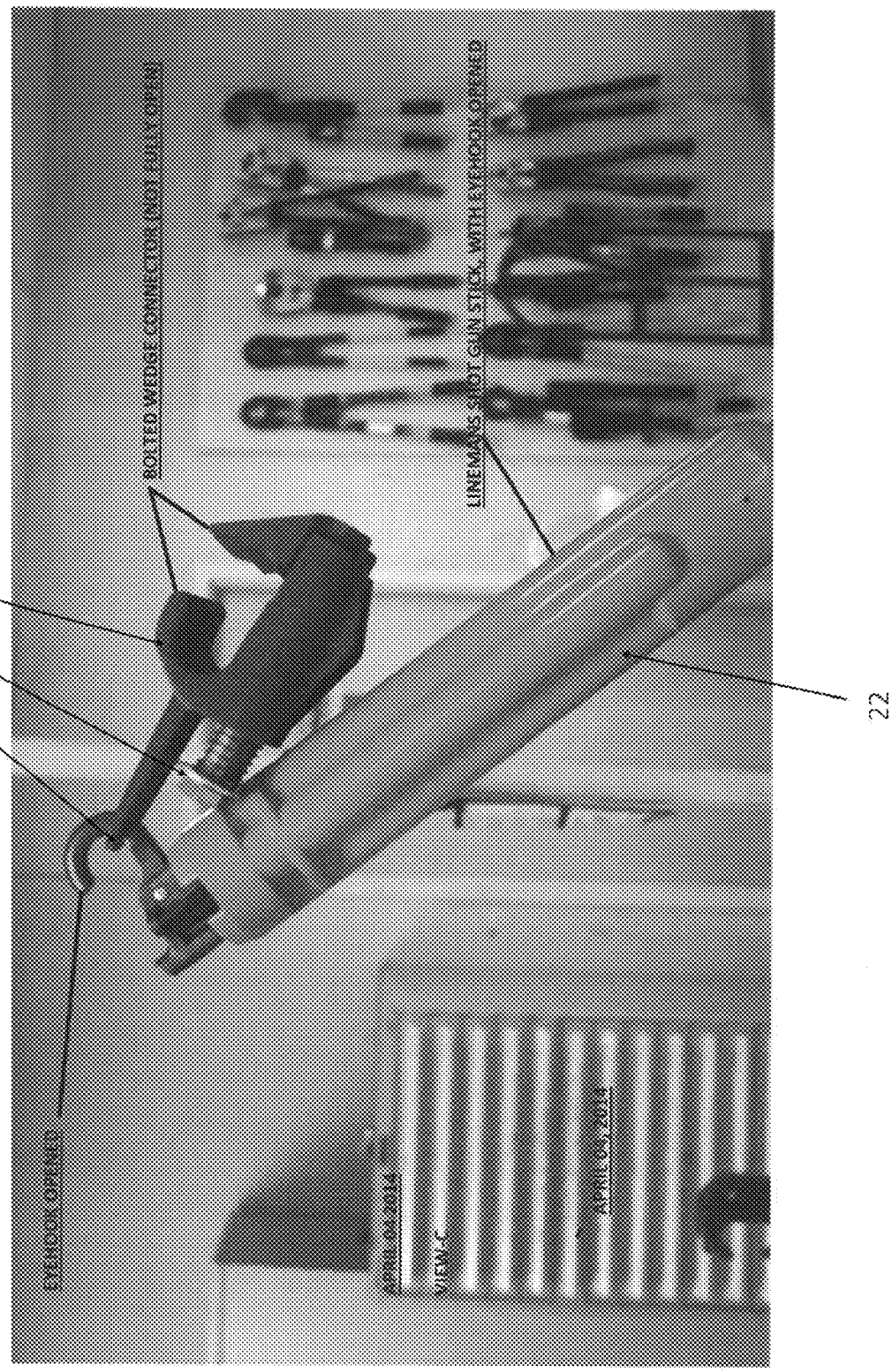
FIG. 6 is an image of a connector according to the present disclosure in use with a hot stick, where the hot stick is shown in an open position.

Referring to the drawings and in particular to FIGS. 1-8, an exemplary embodiment of a spring loaded parallel pad clamp connector according to the present disclosure is shown and is generally referred to by reference numeral 10. Clamp 10 includes a top jaw 12 and a bottom jaw 14 that are secured to one another by one or more compression springs 16 and bolts 18.

Figure 8:
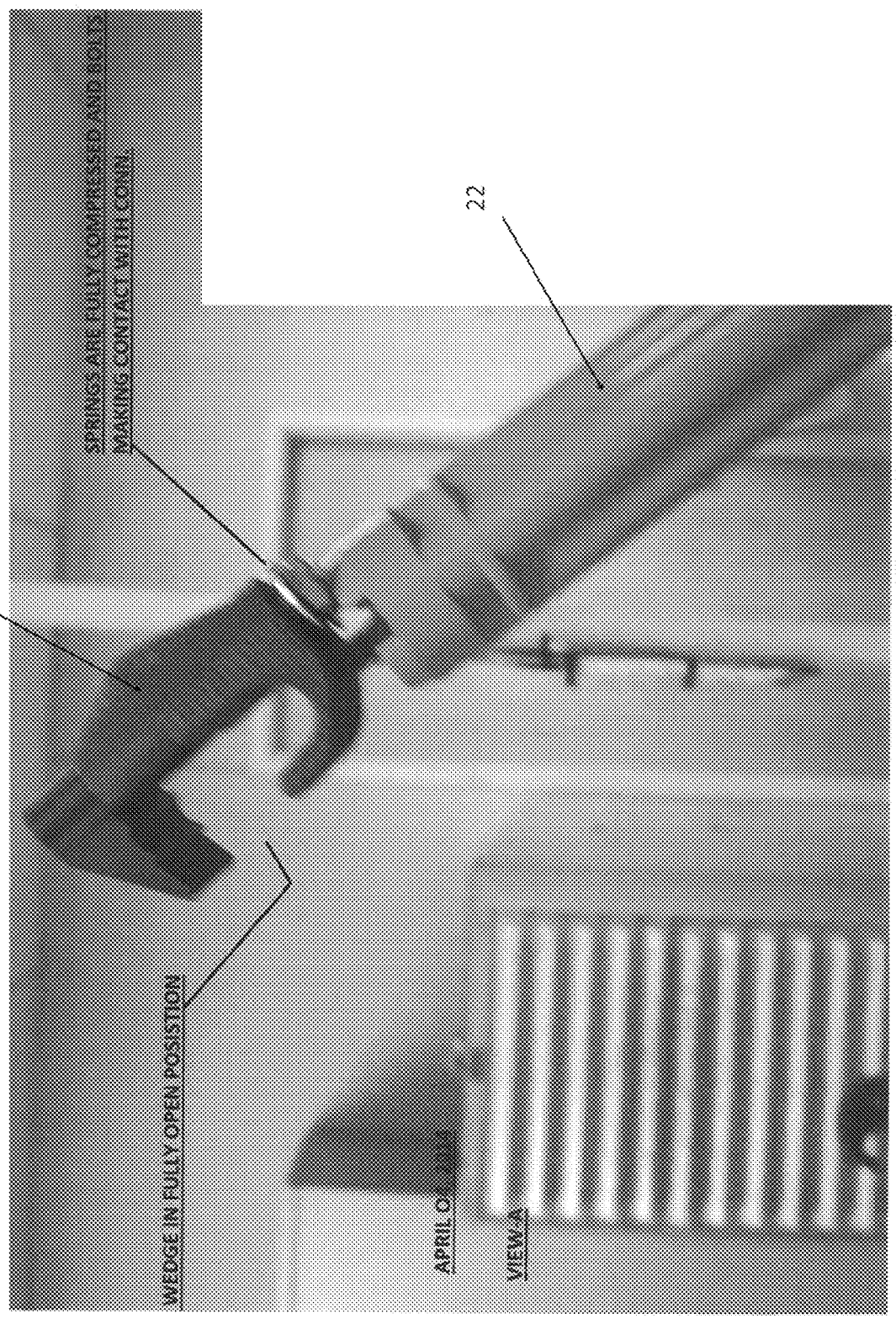
FIG. 8 is an image of the connector of FIG. 6 where the hot stick is shown in a fully closed position.

Clamp 10 is configured to be biased by springs 16 so that top and bottom jaws 12, 14 are in a normal or closed position shown in FIGS. 1-4, but can be moved—by overcoming the force of the springs—to an open position shown in FIG. 8. Clamp 10 includes an open side 30 and a closed side 32, which removably receive a conductor 26 (FIGS. 9-10) therein.

Advantageously, clamp 10 includes an eye 20 depending from bottom member 14 that is positioned, with respect to bolts 18, so that a lineman hot stick 22 when mated to the eye acts on the bolts 18 as a fulcrum as the hot stick is closed to open the clamp.

Specifically and with particular reference to FIGS. 2 and 5, clamp 10 is particularly configured to have a distance 24 defined between a center line of eye 20 and a centerline of bolts 18. Distance 24 is selected to ensure that hot stick 22 abuts or contacts bolts 18 as the hot stick is moved from the open position (FIG. 6) to the closed position (FIG. 8). In some embodiments, distance 24 is 0.950 inches. In other embodiments, distance 24 is about equal to a radius of hot stick 22.

In other embodiments, clamp 10 is configured so that the center line of eye 20 is closer to open side 30 than to closed side 32. In this manner, clamp 10 has a distance 34 between the center line of eye 20 and open side 30 that is at least equal, to but preferably smaller than, a distance 36 between the center line of the eye and closed side 32. Without wishing to be bound by any particular theory, it is believed by the present disclosure that the increased distance 36 provides a mechanical advantage (i.e., increased leverage) by increasing the distance between the fulcrum formed at bolts 18 and the center line of eye 20.

Figure 9:
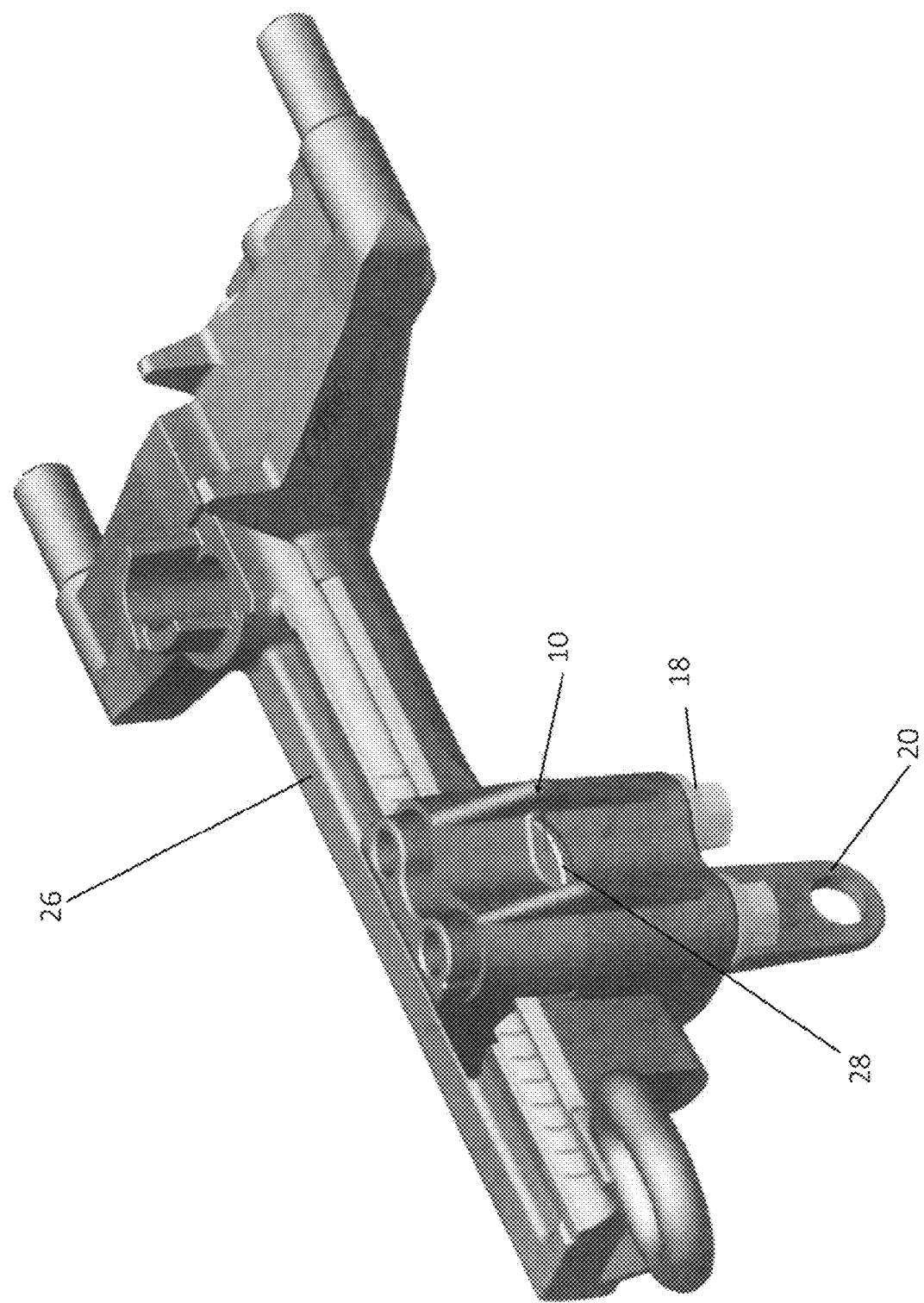
FIG. 9 is a rear perspective view of a connector according to the present disclosure after installation.
Figure 10:
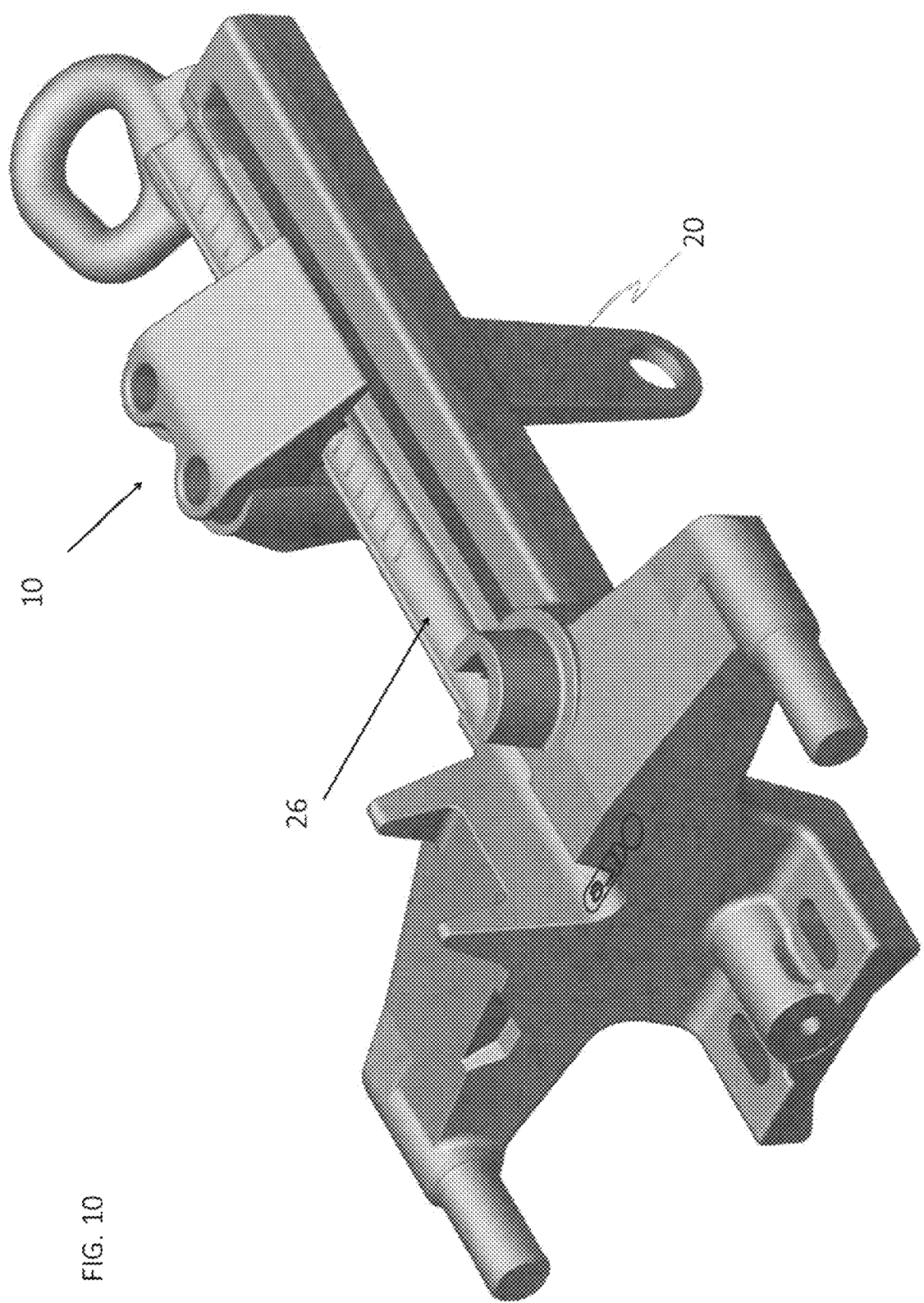
FIG. 10 is a front perspective view of the connector of FIG. 9.
Figure 11:
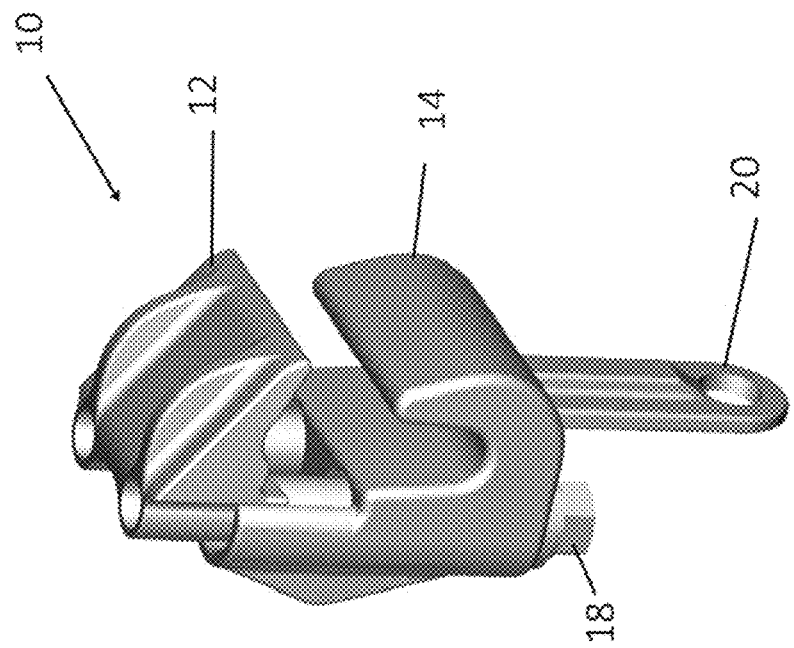
FIG. 11 is a front perspective view of a connector according to the present disclosure—shown in an open position.
Figure 12:
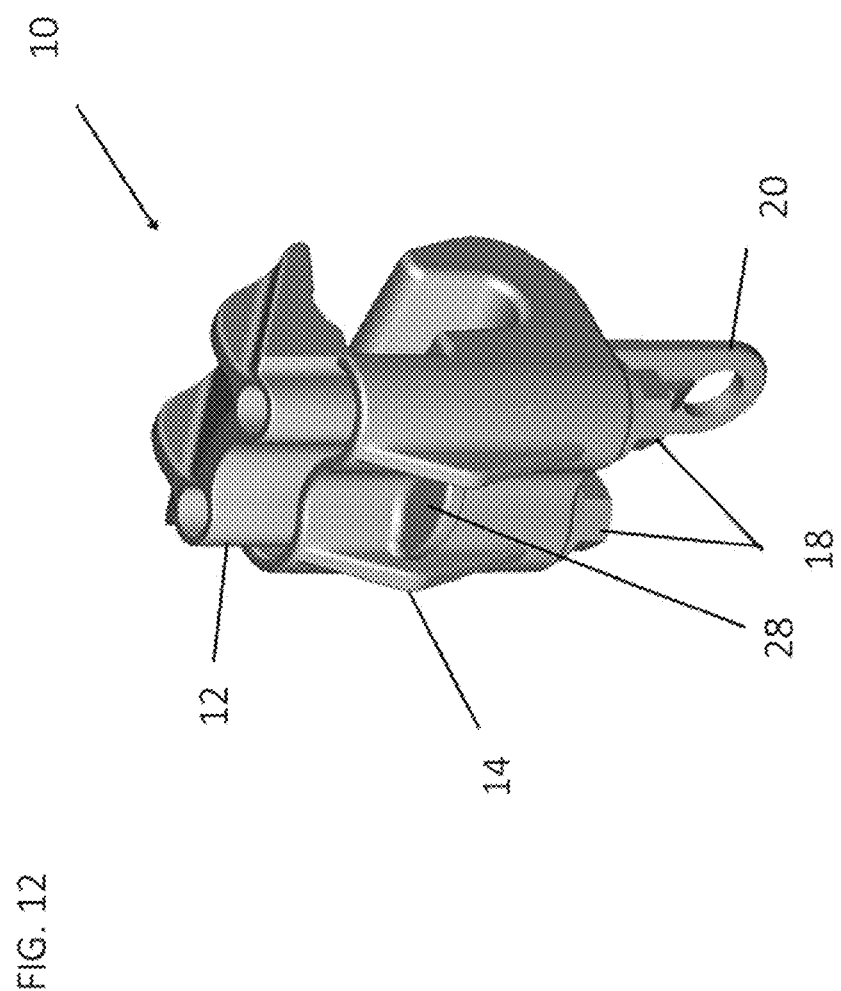
FIG. 12 is a rear perspective view of the connector of FIG. 11.
Figure 13:
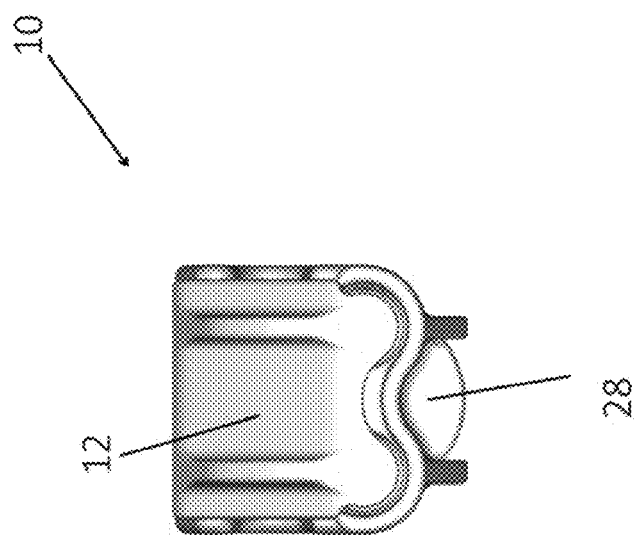
FIG. 13 is a top view of the connector of FIG. 11.
Figure 14:
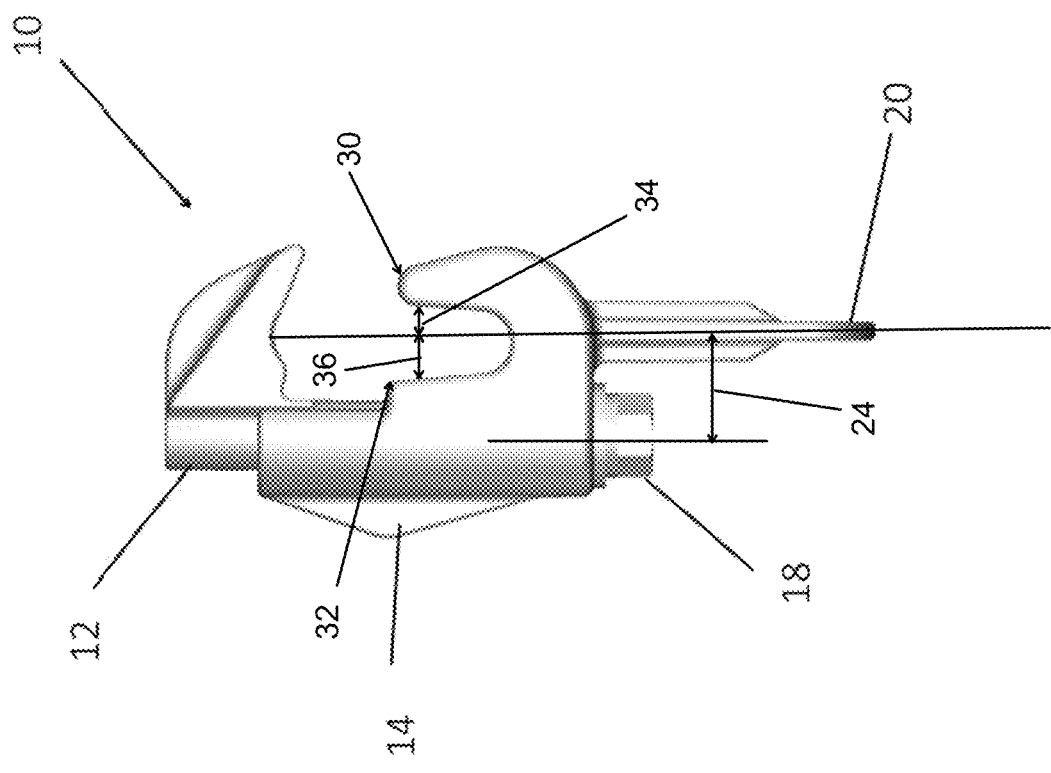
FIG. 14 is a first side view of the connector of FIG. 11.
Figure 15:
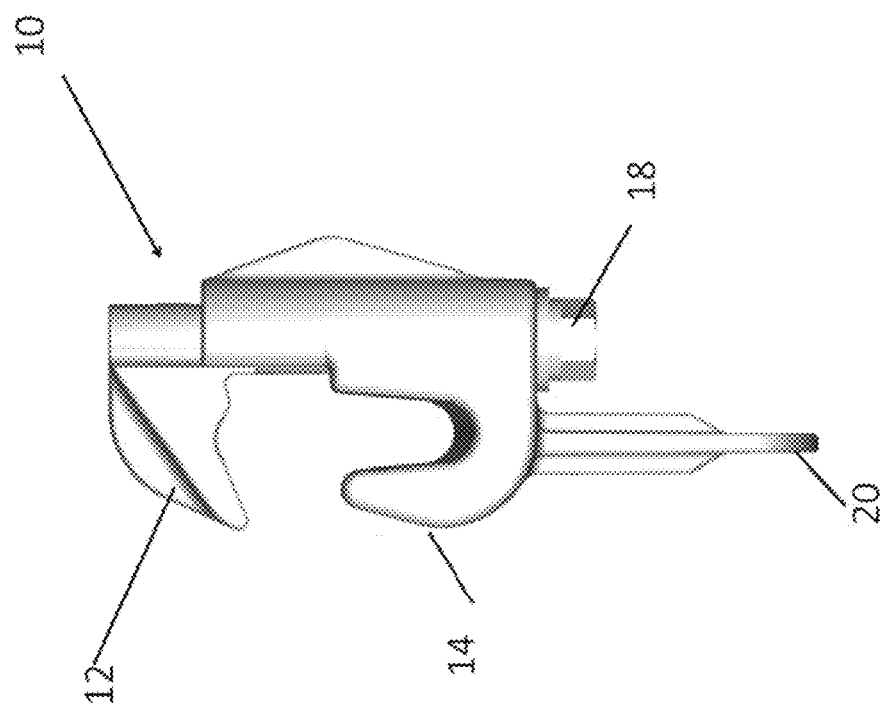
FIG. 15 is a second, opposite side view of the connector of FIG. 11.
Figure 16:
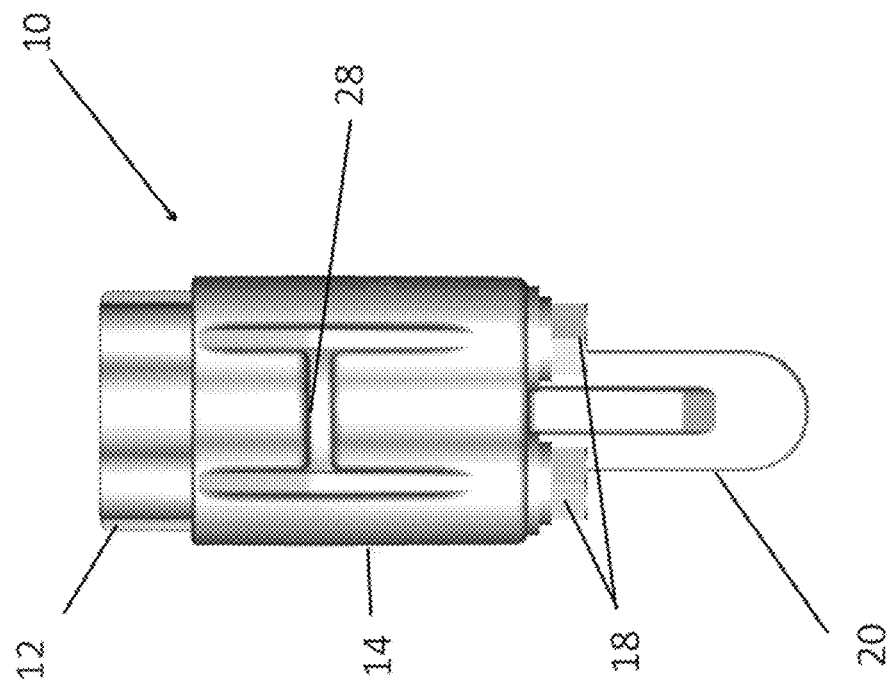
FIG. 16 is a back view of the connector of FIG. 11.
Figure 17:
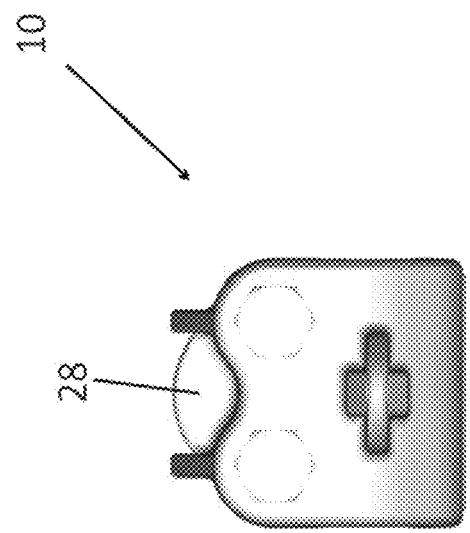
FIG. 17 is a top view of the connector of FIG. 11.
Figure 18:
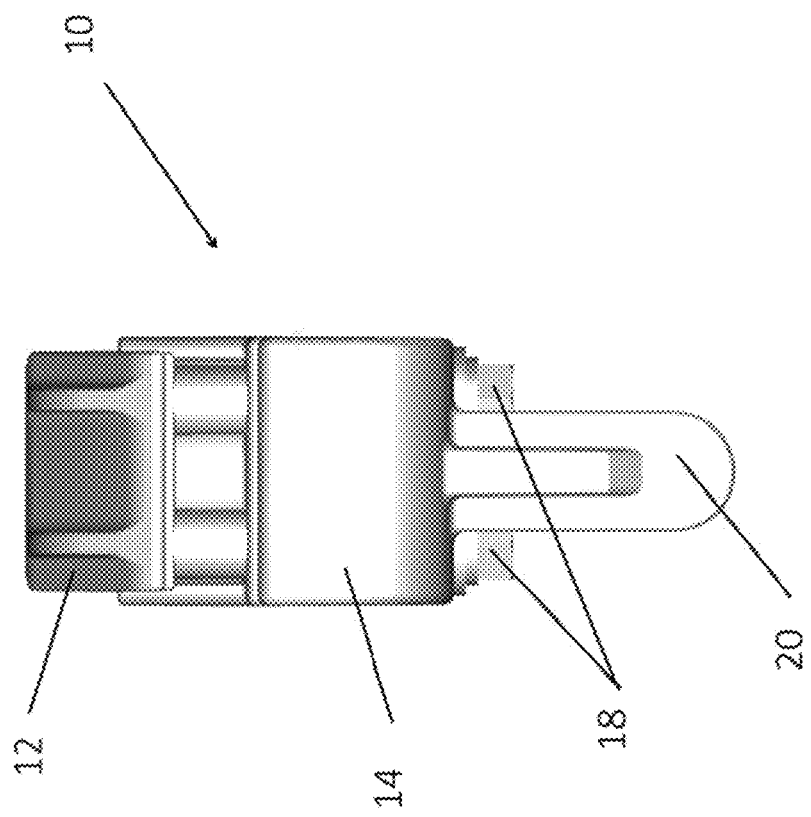
FIG. 18 is a front view of the connector of FIG. 11.

In this manner, clamp 10 can be installed on a conductor or other electrical device 26—shown in FIGS. 9-10—using only the hot stick 22. After installation, hot stick 22 can be used—in a known manner—to tighten bolts 18 to a desired torque.

In some embodiments, clamp 10 includes a thumb pad 28 that allows a user to easily open the clamp as needed.

During installation or removal from device 26, hot stick 22 is first moved to an open position shown in FIG. 6. In this position, the hook of hot stick 22 can be placed in eye 20 of clamp 10—where springs 16 maintain the clamp in the normally closed position. Next, hot stick 22 is moved from the open position of FIG. 6 to the partially closed position shown in FIG. 7. As the hot stick 22 is moved from the open position towards the closed position, the hook of the hot stick (with eye 20 connected thereto) is drawn into the hot stick. As the hook and eye 20 are drawn into hot stick 22, the bolts 18 abut or otherwise contact the hot stick—which acts a fulcrum on which the bolts pivot to the position shown in FIG. 7.

Figure 7:
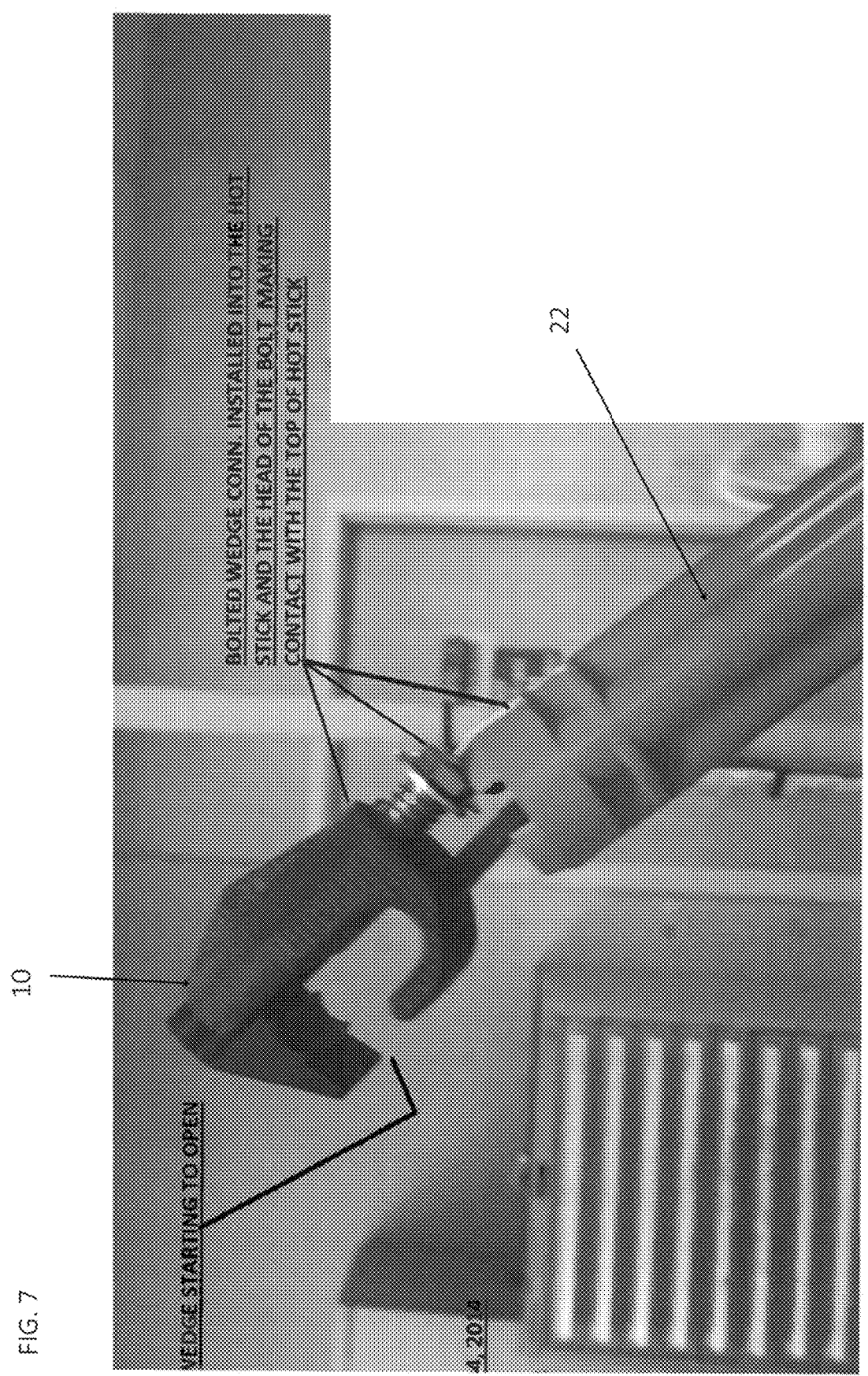
FIG. 7 is an image of the connector of FIG. 6 where the hot stick is shown in a partially closed position.

Once bolts 18 are abutting hot stick 22 in the position shown in FIG. 7, further movement of the hot stick to the fully closed position of FIG. 8 is sufficient to overcome the force of springs 16 to move clamp 10 to its open position (FIGS. 8 and 11-18).

After opening clamp 10—namely once the distance between top and bottom jaws 12, 14 has been increased—the clamp can be installed using hot stick 22 as an extension arm onto conductor 26 with the conductor between the top and bottom jaws. Upon returning hot stick 22 to its open position (FIG. 6), the hook of the hot stick can be removed from eye 20 with clamp 10 being held on conductor 26 as a result of springs 16 compressing or closing jaws 12, 14.

After removal of hot stick 22 from clamp 10, the clamp can be further tightened by increasing the torque on bolts 18 to a desired torque.

Simply stated, clamp 10 has been advantageously configured by a simple but effective positioning of eye 20 with respect to bolts 18 (or any other surface of the clamp) in a manner that allows the movement of the hot stick from its open position to its closed position to translate first into a rotation of the clamp with respect to the hot stick from the state of FIG. 6 to the state of FIGS. 5 and 7, then to allow the movement of the hot stick from its open position to its closed position to translate into a linear force on the clamp sufficient to open the clamp—making it connectable to conductor 26.

It should be recognized that clamp 10 has been illustrated herein by way of example as having bolts 18 positioned with respect to eye 20 so that the bolts act as the surface on which hot stick 22 acts. Of course, it is contemplated by the present disclosure for clamp 10 to be configured such that any surface acts as the fulcrum and force translation surface.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A spring loaded parallel pad clamp connector, comprising:
   a top jaw;
   a bottom jaw having an eye for receiving a lineman hot stick;
   one or more bolts, the top and bottom jaws are secured to one another by the one or more bolts;
   one or more springs biasing the top and bottom jaws to maintain the top and bottom jaws in a normally closed position; and
   a surface comprising a portion of the one or more bolts;
   wherein the surface is positioned a predetermined distance from a centerline of the eye so that the surface acts as a fulcrum on which the lineman hot stick pivots to allow the movement of the lineman hot stick from its open position to its closed position to translate into a linear force on the eye sufficient to move the bottom jaw away from the normally closed position.

2. The spring loaded parallel pad clamp connector of claim 1, wherein the predetermined distance is 0.950 inches.

3. The spring loaded parallel pad clamp connector of claim 1, wherein the center line of the eye is closer to an open side of the top and bottom jaws than to a closed side of the top and bottom jaws.

4. The spring loaded parallel pad clamp connector of claim 1, wherein the predetermined distance is defined between the center line of the eye and a centerline of the bolts.

5. The spring loaded parallel pad clamp connector of claim 1, wherein the predetermined distance is sufficient to allow the lineman hot stick to abut or contact the bolts.

6. The spring loaded parallel pad clamp connector of claim 1, wherein the predetermined distance is equal to a radius of the lineman hot stick.

7. The spring loaded parallel pad clamp connector of claim 1, wherein the center line of the eye is closer to an open side of the top and bottom jaws than to a closed side of the top and bottom jaws.

8. The spring loaded parallel pad clamp connector of claim 7, wherein the bolts are proximate the closed side of the top and bottom jaws.

9. The spring loaded parallel pad clamp connector of claim 7, wherein the bolts are offset from the closed side of the top and bottom jaws in a direction remote from the open side.

10. The spring loaded parallel pad clamp connector of claim 7, further comprising a distance between the center line of the eye and the open side that is at least equal to a distance between the center line of the eye and the closed side.

11. The spring loaded parallel pad clamp connector of claim 7, further comprising a distance between the center line of the eye and the open side that is smaller than a distance between the center line of the eye and the closed side.

12. A spring loaded parallel pad clamp connector, comprising:
   a top jaw;
   a bottom jaw having an eye for receiving a lineman hot stick;
   a bolt slideably securing the top and bottom jaws to one another so as to define an open side of the top and bottom jaws and a closed side of the top and bottom jaws, the bolt being proximate the closed side such that a centerline of the bolt is a predetermined distance from a centerline of the eye, the predetermined distance being sufficient such that a surface of the bolt acts as a fulcrum; and
   a spring biasing the top and bottom jaws to maintain the top and bottom jaws in a normally closed position,
   wherein the lineman hot stick pivots on the fulcrum to allow the movement of the lineman hot stick from its open position to its closed position to translate into a linear force on the eye sufficient to move the bottom jaw away from the normally closed position.

13. The spring loaded parallel pad clamp connector of claim 12, wherein the center line of the eye is closer to the open side than to the closed side.

14. The spring loaded parallel pad clamp connector of claim 12, wherein the predetermined distance is equal to a radius of the lineman hot stick.

15. The spring loaded parallel pad clamp connector of claim 12, wherein the predetermined distance is 0.950 inches.

16. The spring loaded parallel pad clamp connector of claim 15, further comprising a distance between the center line of the eye and the open side that is at least equal to a distance between the center line of the eye and the closed side.

17. The spring loaded parallel pad clamp connector of claim 15, further comprising a distance between the center line of the eye and the open side that is smaller than a distance between the center line of the eye and the closed side.

* * * * *